(12) United States Patent
Ruan (10) Patent No.: US 9,162,790 B2
(45) Date of Patent: Oct. 20, 2015

(54) METHOD FOR PREPARING PAPER CUP (71) Applicant: SHANGHAI XINYU PAPER CUP CO., LTD., Shanghai (CN)

(72) Inventor: Jianying Ruan, Shanghai (CN)

(73) Assignee: SHANGHAI XINYU PAPER CUP CO., LTD., Shanghai (CN)

( * ) Notice: Subject to any disclaimer, the term of this patent is extended or adjusted under 35 U.S.C. 154(b) by 275 days.

(21) Appl. No.: 13/786,442

(22) Filed: Mar. 5, 2013

(65) Prior Publication Data

US 2013/0175267 A1 Jul. 11, 2013

Related U.S. Application Data

(63) Continuation-in-part of application No. PCT/CN2012/000266, filed on Mar. 2, 2012.

(30) Foreign Application Priority Data

Mar. 9, 2011 (CN) .......................... 2011 1 0056418
May 19, 2011 (CN) ...................... 2011 2 0161410 U (51) Int. Cl.
*B65B 55/12* (2006.01)
*B31F 1/00* (2006.01)
(Continued)

(52) U.S. Cl.
CPC ...... *B65D 3/06* (2013.01); *A47G 19/22* (2013.01); *A47G 19/23* (2013.01); *B31F 1/007* (2013.01); *B31F 1/0051* (2013.01); *B31F 1/0054* (2013.01); *B65B 55/12* (2013.01);
(Continued)

(58) Field of Classification Search
CPC ...... B31F 1/007; B31F 1/0054; B31F 1/0051; A47G 19/22; A47G 19/23; B65D 3/06; B65D 3/22
USPC .......... 53/425, 428; 493/53, 55, 58, 111, 152, 493/320
See application file for complete search history.

(56) References Cited

U.S. PATENT DOCUMENTS 1,952,435 A * 3/1934 Hogan ........................... 229/400
2,279,289 A * 4/1942 Page ............................. 493/128

(Continued)

FOREIGN PATENT DOCUMENTS

CN 2682954 Y 3/2005
CN 2759314 Y 2/2006
(Continued)

OTHER PUBLICATIONS

International Search Report of PCT Patent Application No. PCT/CN2012/000266 issued on Apr. 26, 2012, 2 pages.
(Continued)

*Primary Examiner* — Stephen F Gerrity (57) ABSTRACT

A paper cup, including: a cup body including a surface, and a base. A plurality of uneven stiffeners are arranged on the surface of the cup body. A method for preparing the paper cup includes: 1) selecting polyethylene (PE) or polylactic acid (PLA) coated paper as a raw material, the PE or the PLA coated paper including: a coated side, and a printed side; 2) printing a figure on the printed side of the PE or the PLA coated paper; 3) embossing uneven stiffeners on the paper via an embossing device; 4) cutting the paper into a shape of a section as a cup body via a die cutting machine; 5) shaping the cup body and the base into the paper cup via a molding machine; and 6) sterilizing, and packaging the paper cups.

1 Claim, 6 Drawing Sheets (51) Int. Cl.
*B65D 3/22* (2006.01)
*B65D 3/06* (2006.01)
*A47G 19/23* (2006.01)
*A47G 19/22* (2006.01)
*B65D 65/38* (2006.01)

(52) U.S. Cl.
CPC ............... *B65D 3/22* (2013.01); *B65D 65/38* (2013.01); *Y02W 90/12* (2015.05); *Y10T 156/1052* (2015.01)

(56) References Cited

U.S. PATENT DOCUMENTS

| | | | | |
|---|---|---|---|---|
| 3,333,515 | A | * | 8/1967 | McGlynn ..................... 493/379 |
| 3,487,443 | A | * | 12/1969 | Wise et al. ..................... 229/400 |
| 3,603,218 | A | * | 9/1971 | Ludder .......................... 493/55 |
| 4,452,596 | A | * | 6/1984 | Clauss et al. ................. 493/107 |
| 4,579,250 | A | * | 4/1986 | Fuss et al. ......................... 221/1 |
| 5,191,979 | A | * | 3/1993 | Nemeroff ................... 206/459.5 |
| 5,226,585 | A | * | 7/1993 | Varano .......................... 229/400 |
| 5,651,851 | A | * | 7/1997 | Gatcomb ..................... 156/250 |
| 5,769,311 | A | * | 6/1998 | Morita et al. ................. 229/403 |
| 6,253,995 | B1 | * | 7/2001 | Blok et al. .................... 229/403 |
| 2007/0253069 | A1 | * | 11/2007 | Saville, Jr. .................... 359/619 |
| 2008/0087677 | A1 | * | 4/2008 | Robertson et al. ............ 220/694 |
| 2012/0318807 | A1 | * | 12/2012 | Leser et al. ................ 220/592.17 |
| 2014/0103103 | A1 | * | 4/2014 | Fu et al. ........................ 229/403 |

FOREIGN PATENT DOCUMENTS

| | | | | |
|---|---|---|---|---|
| CN | 1961786 | A | | 5/2007 |
| CN | 101096824 | A | | 1/2008 |
| CN | 201452583 | U | | 5/2010 |
| CN | 201743403 | U | | 2/2011 |
| JP | 01316242 | A | * 12/1989 | ............. B29C 47/04 |
| JP | 08151021 | A | * 6/1996 | ............. B65B 55/08 |
| JP | 2000109046 | A | * 4/2000 | ............... B65D 3/22 |
| JP | 2000296569 | A | * 10/2000 | ................ B31F 1/07 |
| JP | 2003205928 | A | * 7/2003 | ............... B65D 3/22 |
| JP | 2007326599 | A | * 12/2007 | ............... B65D 3/22 |
| JP | 2009173296 | A | * 8/2009 | ............... B65D 3/22 |
| WO | WO 2006042908 | A1 | * 4/2006 | ............... B65D 3/06 |

OTHER PUBLICATIONS

1st Office Action of counterpart Chinese Patent Application No. 201110143294.X issued on Mar. 1, 2013, 7 pages.

* cited by examiner

METHOD FOR PREPARING PAPER CUP

CROSS-REFERENCE TO RELATED APPLICATIONS

This application is a continuation-in-part of International Patent Application No. PCT/CN2012/000266 with an international filing date of Mar. 2, 2012, designating the United States, and further claims priority benefits to Chinese Patent Application No. 201110056418.0 filed Mar. 9, 2011, and to Chinese Patent Application No. 201120161410.6 filed May 19, 2011. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to a paper cup, and more particularly to a paper cup and a method for preparing the same.

2. Description of the Related Art

Recently, paper cups have been widely used because of their convenience. In the market, the paper cup is single layered, which has a low intensity, and is easily deformed after being filled with hot water, plus, it is not good at heat insulating and anti-sliding.

A new kind of double layered paper cup including an outer cup body and an inner cup body has been disclosed. Although this structure is useful to strengthen the intensity, and has a good heat insulation capability due to the gap between the inner and the outer cup body, the gap easily causes unevenness and deformation of the cup body.

SUMMARY OF THE INVENTION

In view of the above-described problems, it is one objective of the invention to provide a paper cup and a method for preparing the same. The paper cup is anti-sliding, thermal insulated, and has an uneven surface.

To achieve the above objective, in accordance with one embodiment of the invention, there is provided a paper cup, comprising: a cup body comprising a surface, and a base. A plurality of uneven stiffeners are arranged on the surface of the cup body.

In a class of this embodiment, the cup body is a single layered cup body, and the uneven stiffeners are arranged on the surface.

In a class of this embodiment, the cup body is a double layered cup body comprising an inner cup body and an outer cup body. Each cup body comprises an inner surface and an outer surface. The uneven stiffeners are arranged on the inner surface or the outer surface of each cup body. The surface comprising the uneven stiffeners is an uneven surface. The inner cup body and the outer cup body are tightly attached.

In a class of this embodiment, the inner surface of the inner cup body is a smooth surface, and the outer surface of the inner cup body is the uneven surface; or the inner surface of the inner cup body is the uneven surface, and the outer surface of the inner cup body is the smooth surface; or the inner surface of the outer cup body is the smooth surface, and the outer surface of the outer cup body is the uneven surface; or the inner surface of the outer cup body is the uneven surface, and the outer surface of the outer cup body is the smooth surface.

In a class of this embodiment, the uneven stiffeners are in regular or irregular uneven shapes; the uneven shapes are circular point, strip, undulate, triangle, or polygon; and the paper cup is in a shape of an inverted trapezoid or a cylinder.

A method for preparing the paper cup, comprises:
a) selecting polyethylene (PE) or polylactic acid (PLA) coated paper as a raw material, the PE or the PLA coated paper comprising: a coated side, and a printed side;
b) printing a figure on the printed side of the PE or the PLA coated paper;
c) embossing uneven stiffeners on the paper via an embossing device;
d) cutting the paper into a shape of a section as a cup body via a die cutting machine;
e) shaping the cup body and the base into the paper cup via a molding machine; and
f) sterilizing, and packaging the paper cups.

In a class of this embodiment, the embossing device comprises: a smooth cylinder, and a special cylinder comprising uneven shapes, and step c) is carried out as follows: placing the coated side of the PE or the PLA coated paper on a surface of the smooth cylinder, and placing the printed side of the PE or the PLA coated paper on a surface of the special cylinder.

In a class of this embodiment, after step c), the following steps are carried out:
1) heating the special cylinder via a hot pressure, or heating the printed side of the PE or the PLA coated paper via an infrared ray; and embossing the printed side via the special cylinder; and
2) placing the paper after being embossed into cooling equipment for fixing the uneven surface.

In a class of this embodiment, a temperature of the special cylinder after being heated is determined by the molecular structure and the density of the PE or the PLA.

In a class of this embodiment, after step c), the following step is carried out: cold pressing the special cylinder, and embossing the printed side of the PE or the PLA coated paper via the special cylinder.

In a class of this embodiment, a temperature of the smooth cylinder is determined by a melting point of the raw material.

Advantages of the invention are summarized as follows:
The paper cup of the invention has a good intensity, no deformation after being filled with water, good thermal insulation and anti-sliding because of the uneven stiffeners.

BRIEF DESCRIPTION OF THE DRAWINGS

The invention is described hereinbelow with reference to the accompanying drawings, in which.

In the drawings, the following reference numbers are used: 1. Single layered cup body; 2. First base; 3. Stiffener; 4. Printed surface; 5. Smooth cylinder; 6. Special cylinder; 7. First uneven surface; 8. Second base; 9. Inner cup body; 10. Outer cup body; 11. Second uneven surface; and 12. Smooth surface.

DETAILED DESCRIPTION OF THE EMBODIMENTS

Detailed description of the invention will be given below in conjunction with accompanying drawings.

A paper cup, comprises: a cup body comprising a surface, and a base. A plurality of stiffeners are arranged on the surface of the cup body. The cup body is single layered, double layered, or multilayered. Hereinbelow take the single layered and the double layered paper cups as examples.

Figure 1:
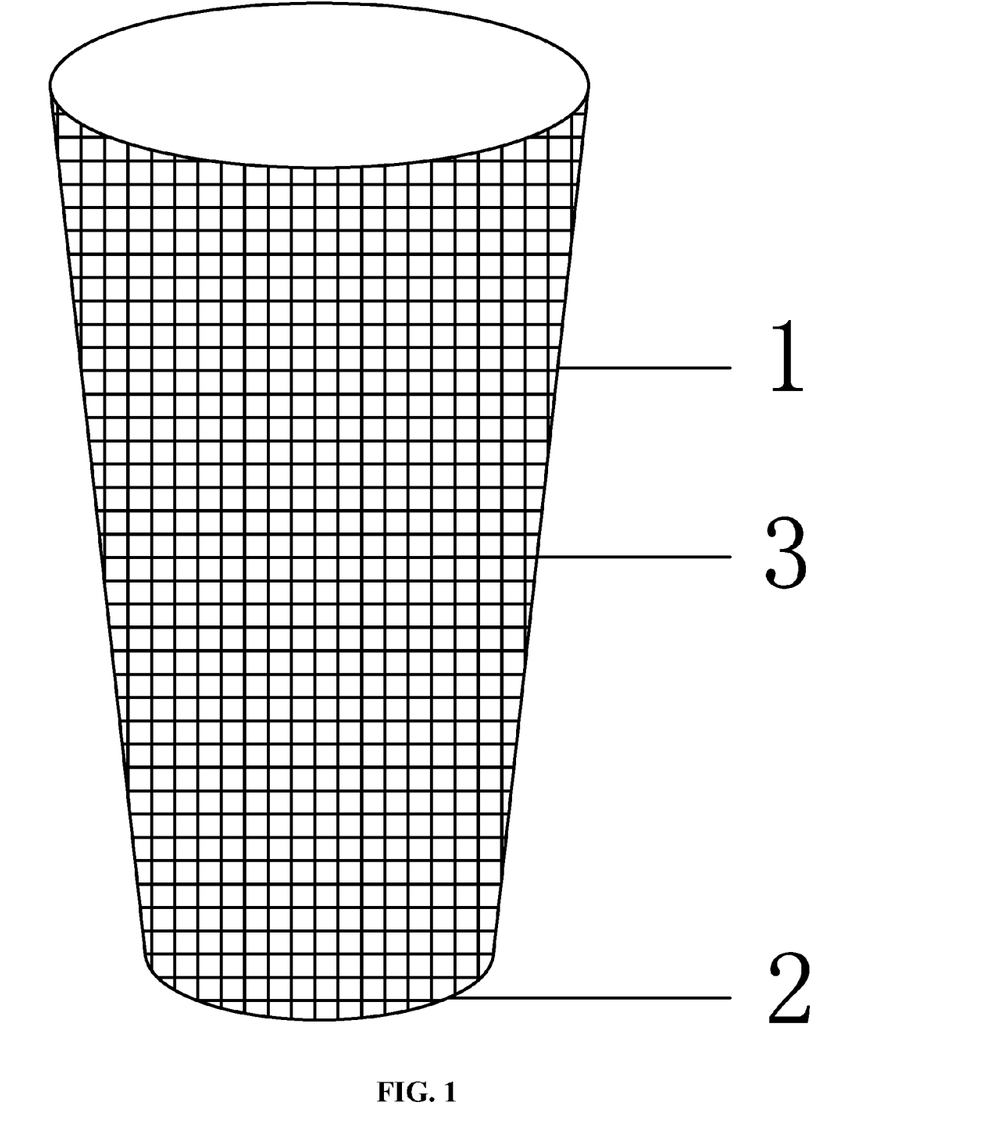
FIG. 1 is a single layered paper cup in accordance with one embodiment of the invention.
Figure 2:
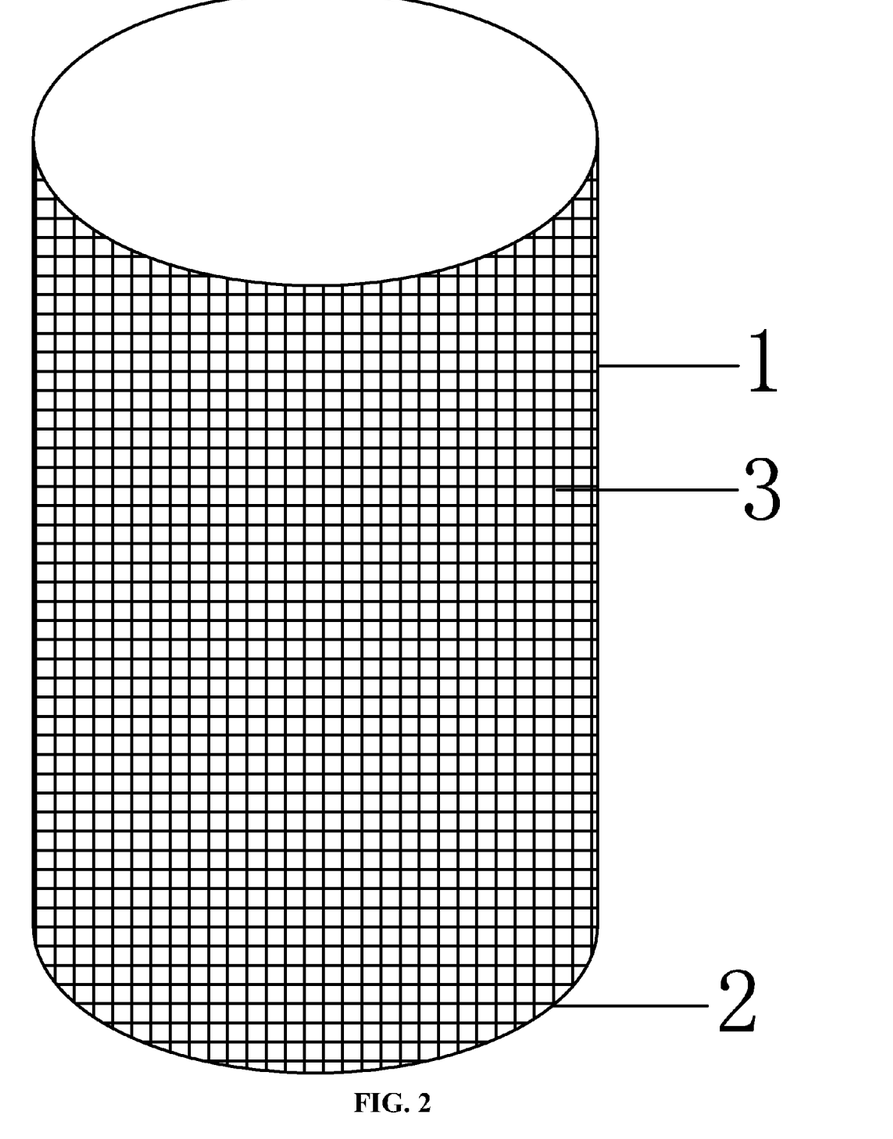
FIG. 2 is a single layered paper cup in accordance with another embodiment of the invention.

As shown in FIGS. 1-2, a paper cup, comprises: a single layered cup body 1, and a first base 2. A plurality of uneven stiffeners 3 are arranged on a surface of the single layered cup body 1. A preferable design is that an outer surface of the cup body 1 is an uneven outer surface where uneven stiffeners 3 are arranged, and an inner surface of the cup body 1 is a smooth surface. Optionally, both the outer and the inner surface of the single layered cup body 1 can be uneven surfaces with arrangement of uneven stiffeners 3, because the arrangement of the uneven stiffeners 3 on the inner surface prevents water in the air from penetrating into the paper cup via the outer surface when the paper cup is filled with ice water.

The uneven stiffeners 3 are in regular or irregular uneven shapes, for example, circular point, strip, undulate, triangle, or polygon.

The paper cup is in a shape of an inverted trapezoid (as shown in FIG. 1) or a cylinder (as shown in FIG. 2).

Figure 3:
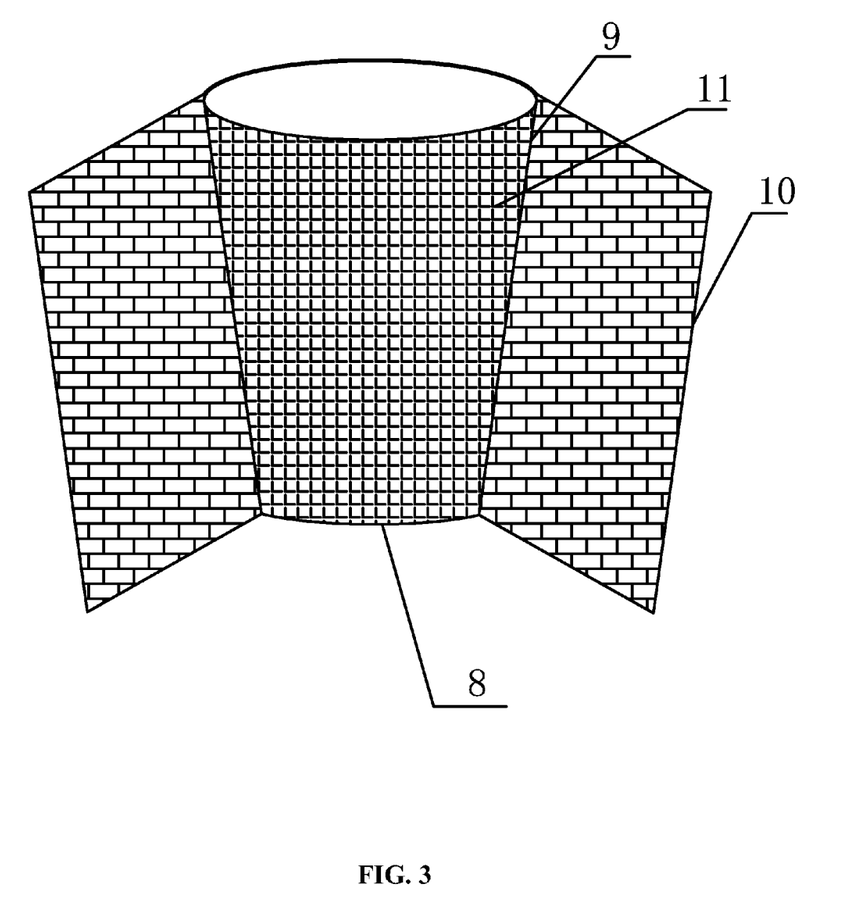
FIG. 3 is an inverted trapezoid shaped doubled layered paper cup in accordance with one embodiment of the invention.
Figure 4:
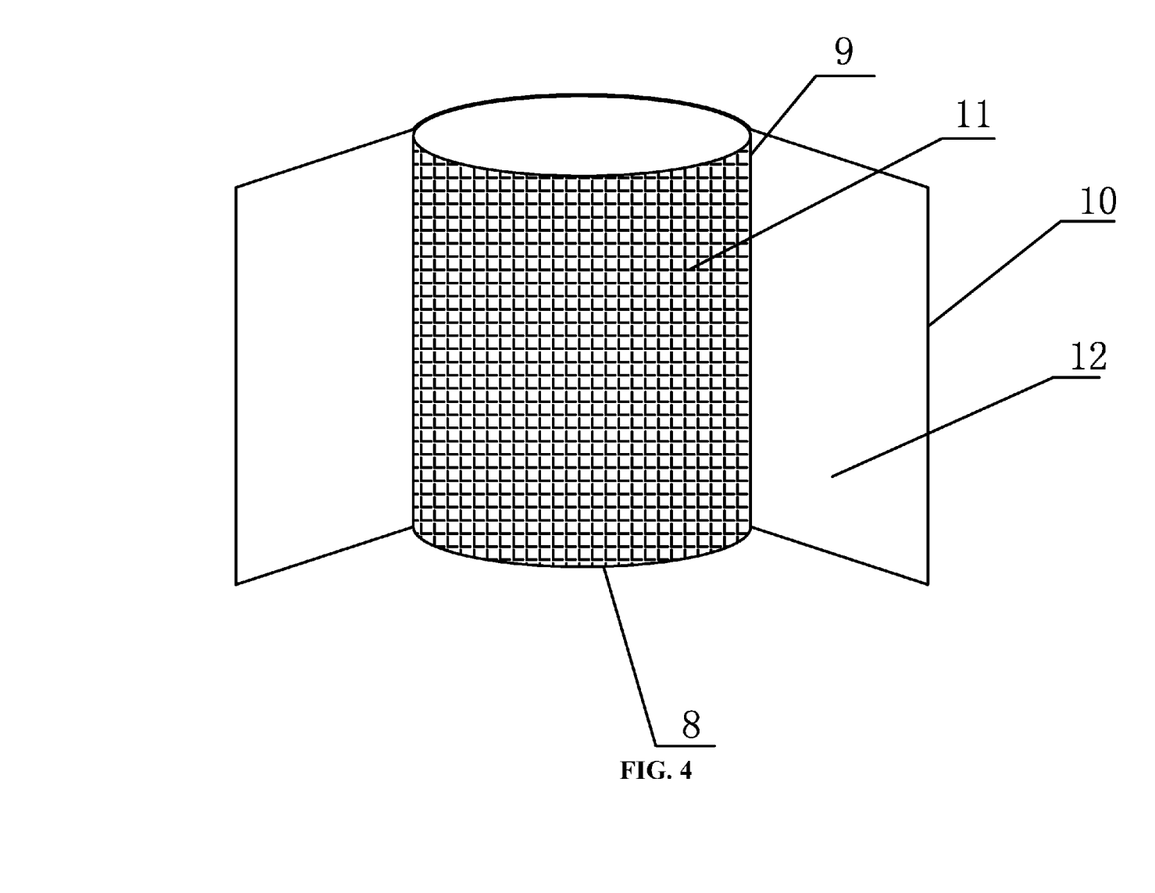
FIG. 4 is a cylindrical shaped double layered paper cup in accordance with one embodiment of the invention.

Besides, the invention provides a double layered paper cup, which comprises: a double layered base 8, and a double layered cup body. The double layered cup body comprises: an inner cup body 9, and an outer cup body 10. Each cup body comprises: an inner surface, and an outer surface. Uneven stiffeners are arranged on the inner surface or the outer surface of each cup body; and the surface comprising uneven stiffeners is an uneven surface 11. The inner cup body 9 and the outer cup body 10 are tightly attached. The attachment is not limited to a usage of glue, or a thermoplastic method particularly to PE or PLA material. When using PE or PLA material, a lower part of the outer cup body 10 is slightly longer than a lower part of the inner cup body 9, and the lower part of the outer cup body 10 wraps the lower part of the inner cup body 9, then using thermoplastic method can achieve the tight attachment between the inner cup body 9 and the outer cup body 10. The thermoplastic method is more sanitary than the usage of glue.

The doubled layered paper cup is a shape of an inverted trapezoid (as shown in FIG. 3) or a cylinder (as shown in FIG. 4).

An exploded view of the double layered paper of the invention is shown in FIG. 3, the inner surface of the inner cup body 9 is a smooth surface 12, and the outer surface of the inner cup body 9 is a second uneven surface 11 on which a plurality of uneven stiffeners are arranged. The inner surface of the outer cup body 10 is a second uneven surface 11, and the outer surface of the outer cup body 10 is the smooth surface 12, as shown in FIG. 4.

However, the paper cup is not limited to the structure shown in FIG. 3, but can described in the following examples.

Example 1

An inverted trapezoid double layered paper cup, comprises: the inner cup body 9, and the outer cup body 10. The inner surface of the inner cup body 9 is a smooth surface 12, and the outer surface of the inner cup body 9 is a second uneven surface 11. The inner surface of the outer cup body 10 is the smooth surface 12, and the outer surface of the outer cup body 10 is the second uneven surface 11.

Example 2

An inverted trapezoid double layered paper cup, comprises: the inner cup body 9, and the outer cup body 10. The inner surface of the inner cup body 9 is a second uneven surface 11, and the outer surface of the inner cup body 9 is a smooth surface 12. The inner surface of the outer cup body 10 is the smooth surface 12, and the outer surface of the outer cup body 10 is the second uneven surface 11.

Example 3

An inverted trapezoid double layered paper cup, comprises: the inner cup body 9, and the outer cup body 10. The inner surface of the inner cup body 9 is a second uneven surface 11, and the outer surface of the inner cup body 9 is a smooth surface 12. The inner surface of the outer cup body 10 is the second uneven surface 11, and the outer surface of the outer cup body 10 is the smooth surface 12.

An exploded view of a cylinder double layered paper cup is shown in FIG. 4. The paper cup comprises: an inner cup body 9, and an outer cup body 10. An inner surface of the inner cup body 9 is a smooth surface 12, and an outer surface of the inner cup body 9 is a second uneven surface 11 on which uneven stiffeners are arranged. An inner surface of the outer cup body 10 is a smooth surface 12, and an outer surface of the outer cup body 10 is a second uneven surface 11.

The arrangement of the stiffeners on the inner or outer surface of each cup body 9, 10 prevents water in the air from penetrating into the cup via the inner and the outer cup body 9, 10 when the cup is filled with ice water; moreover, the contact surface of the inner or outer cup body 9, 10 decreases, thereby achieving the objective of thermal insulation.

The uneven stiffeners are in regular or irregular uneven shapes, for example, circular point, strip, undulate, triangle, or polygon.

The paper cup of the present invention has a good intensity, no deformation after filling with water, good thermal insulation and anti-sliding due to the uneven stiffeners.

Figure 5:
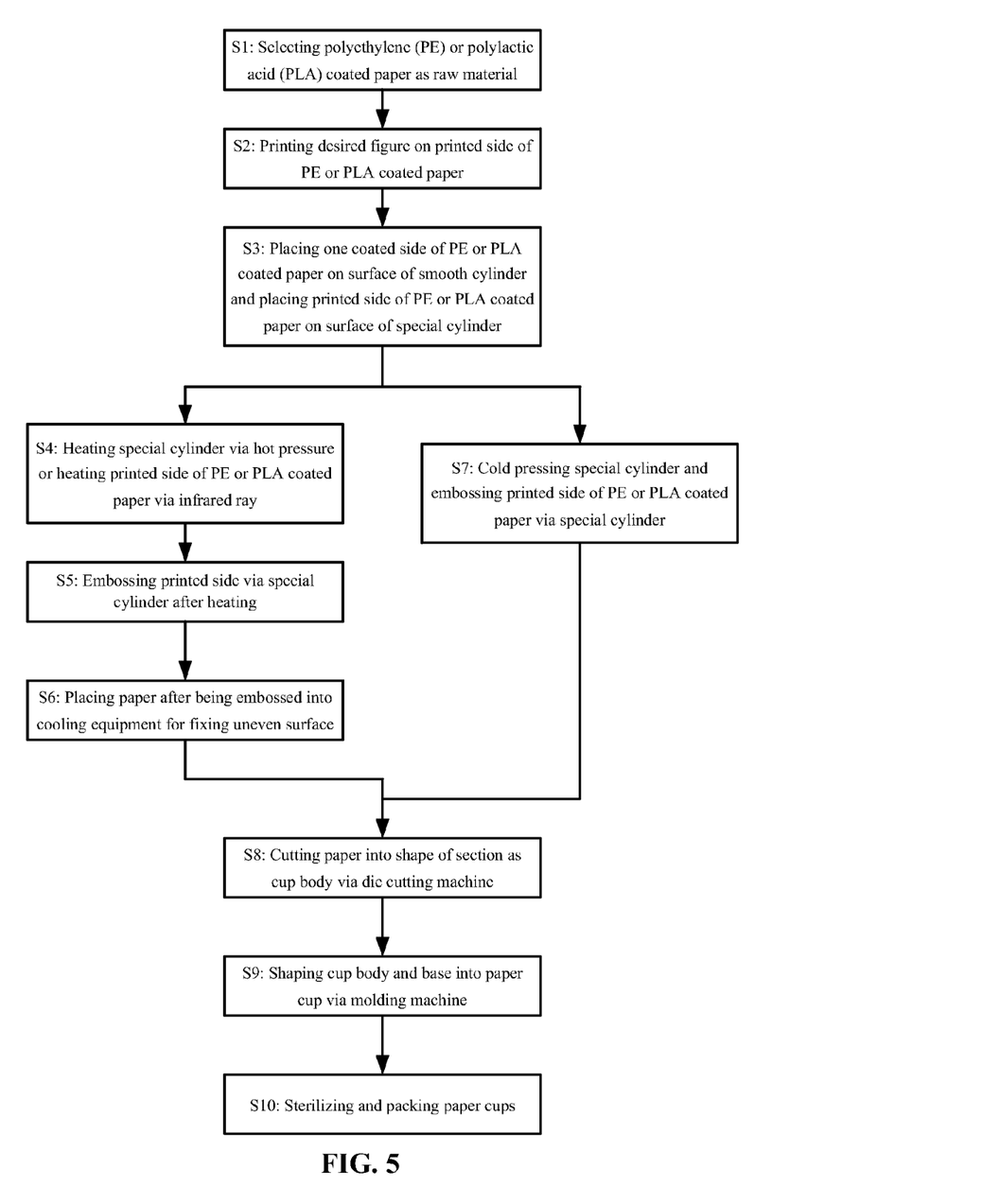
FIG. 5 is a flow chart of a method for preparing a paper cup of the invention in accordance with one embodiment of the invention.

A method for preparing the paper cup, as shown in FIG. 5, comprises steps as follows:

S1: select polyethylene (PE) or polylactic acid (PLA) coated paper as a raw material, according to a combination of a molecular structure and a density of the PE or the PLA, and a bulk of a paper; the PE or the PLA coated paper comprising: a coated side, and a printed side 4. It should be noted that a preferable raw material is the PE or the PLA, but not limited to such two materials.

S2: print a desired figure on the printed side 4 of the PE or the PLA coated paper.

Thereafter, place the paper after being printed on an embossing device to emboss uneven stiffeners, which specifically comprises S3-S6, or comprises S3 and S7.

Figure 6:
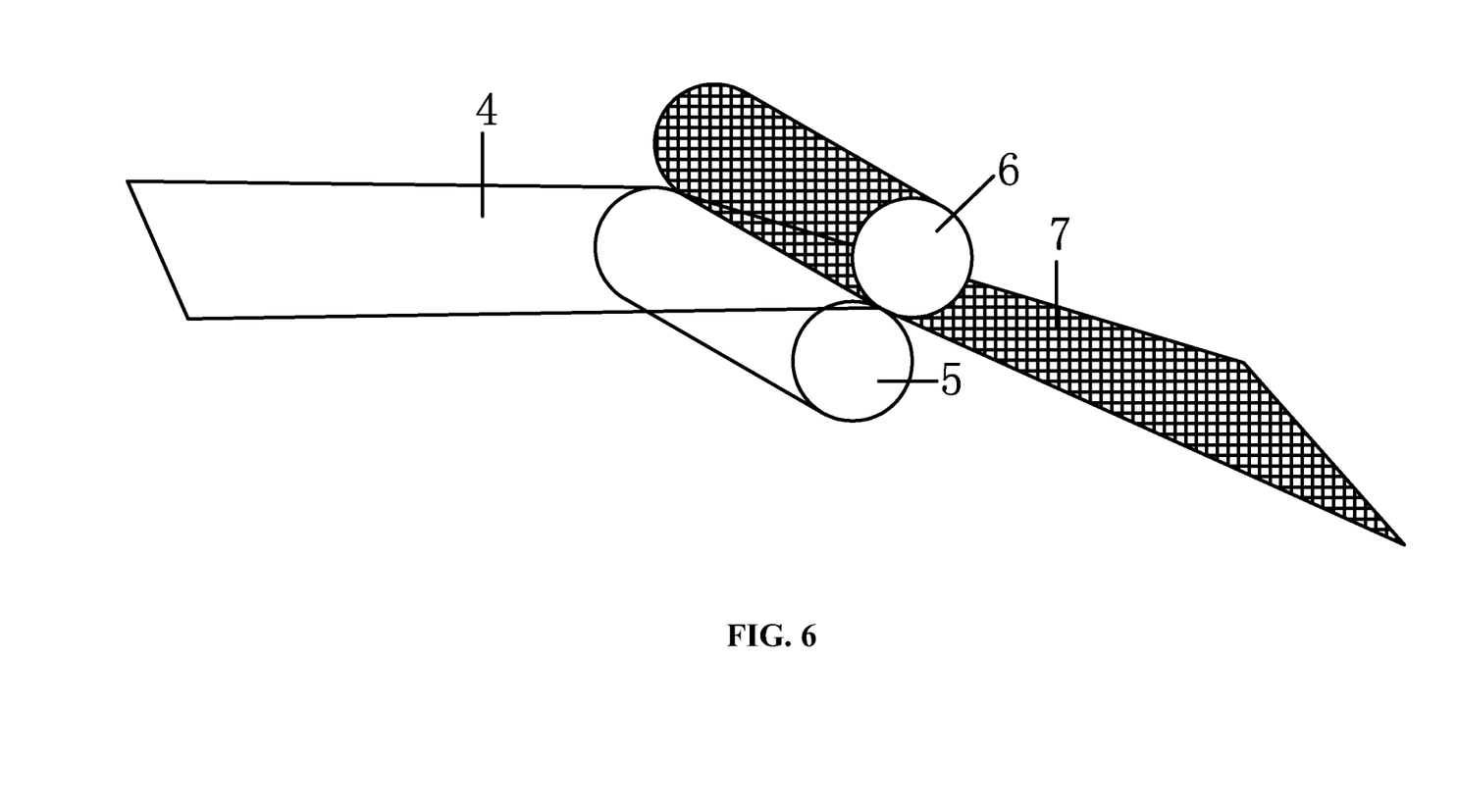
FIG. 6 is a structural diagram of an embossing device in accordance with one embodiment of the invention.

S3, provide an embossing device comprising a smooth cylinder and a special cylinder; place the coated side of the PE or the PLA coated paper on a surface of the smooth cylinder, and place the printed side 4 of the PE or the PLA coated paper. The special cylinder 6 comprises uneven shapes arranged on a surface, thus, a first uneven surface is produced after be embossed by the special cylinder 6, as shown in FIG. 6. A temperature of the smooth cylinder 5 is determined by a melting point of the raw material. For example, if the material is PE, the temperature of the smooth cylinder 5 is controlled at 60° C. below; and if the material is PLA, the temperature of the sooth cylinder 5 is controlled at 20° C. below.

In order to get a better embossing effect, another smooth cylinder can be placed next to the special cylinder shown in FIG. 4, so that after being embossed by the special cylinder 6, the paper is output from the smooth cylinder.

S4: heat the special cylinder via a hot pressure, or heat the printed side of the PE or the PLA coated paper via an infrared ray. A temperature of the special cylinder after being heated is determined by the molecular structure and the density of the PE or the PLA.

S5: emboss the printed side via the special cylinder after heating.

S6: place the paper after being embossed into cooling equipment for fixing the uneven surface.

S7: cold press the special cylinder, and emboss the printed side of the PE or the PLA coated paper via the special cylinder.

S8: cut the paper into a shape of a section as a cup body via a die cutting machine;

S9: shape the cup body and the base into the paper cup via a molding machine; and S10: sterilize, and pack the paper cups.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for preparing a paper cup comprising the following steps:
   a) selecting polyethylene (PE) or polylactic acid (PLA) coated paper as a raw material, the PE or the PLA coated paper comprising: a coated side, and a printed side;
   b) printing a figure on the printed side of the PE or the PLA coated paper;
   c) embossing uneven stiffeners on the paper via an embossing device comprising a smooth cylinder and a special cylinder, wherein the special cylinder comprises uneven shapes arranged on a surface;
   d) cutting the paper into a shape of a section as a cup body via a die cutting machine;
   e) shaping the cup body and a base into the paper cup via a molding machine; and
   f) sterilizing, and packaging the paper cup,
   wherein step c) comprises:
      c1) placing the coated side of the PE or the PLA coated paper on a surface of the smooth cylinder, and placing the printed side of the PE or the PLA coated paper on a surface of the special cylinder;
      c21) heating the special cylinder via a hot pressure, or heating the printed side of the PE or the PLA coated paper via an infrared ray; and embossing the printed side via the special cylinder; and
      c22) placing the paper after being embossed into cooling equipment for fixing the uneven stiffeners;
   wherein a temperature of the special cylinder after being heated is determined by the molecular structure and the density of the PE or the PLA;
   wherein a temperature of the smooth cylinder is determined by a melting point of the raw material.

\* \* \* \* \*